E. I. DODDS.
STAY BOLT STRUCTURE.
APPLICATION FILED APR. 26, 1918.
1,298,307.
Patented Mar. 25, 1919.
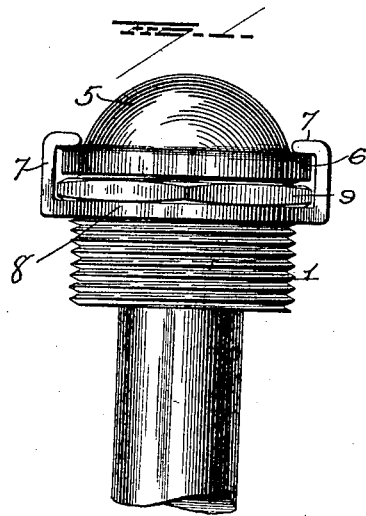
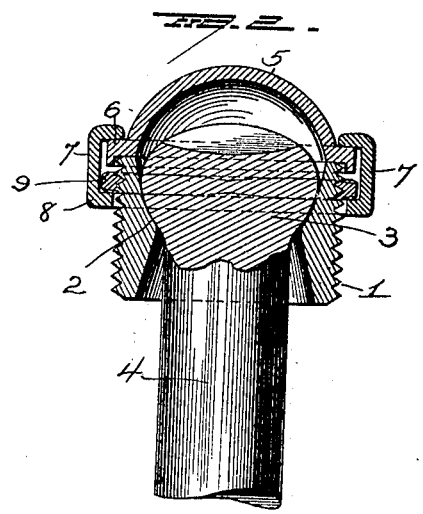
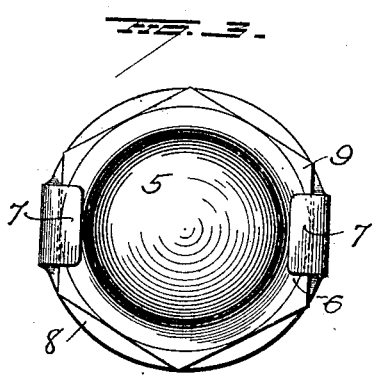
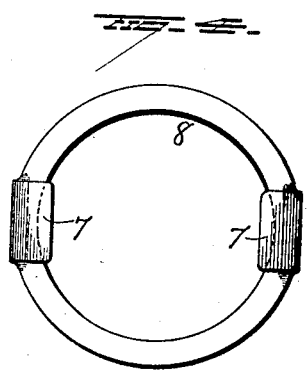
WITNESSES
INVENTOR
E. I. Dodds
By Seymour & Bright
Attorneys

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,298,307.  Specification of Letters Patent.  Patented Mar. 25, 1919.

Application filed April 26, 1918. Serial No. 230,897.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures,—the object of the invention being to provide a structure of this character in which the cap or closure may be quickly removed to expose the bolt for inspection and testing, and in which said cap or closure may be quickly replaced and secured firmly upon its seat.

With this and other objects in view, the invention consists in certain novel features of construction and combinations of parts as hereinafter set forth and pointed out in the claims.

In the accompanying drawings; Figure 1 is a view in elevation of a staybolt structure embodying my invention; Fig. 2 is a sectional view of the same; Fig. 3 is a plan view of the coupling devices, and Fig. 4 is a plan view of the clamping device.

1 represents an exteriorly threaded bearing sleeve having a curved bearing interior surface 2 constituting a bearing for the rounded head 3 of a staybolt 4.

The head of the bolt is covered and inclosed by a cap or closure 5, preferably of partly spherical form,—the dimensions of the concavity of said cap being such as to provide for longitudinal play of the bolt. The cap 5 is seated on the outer end of the bearing sleeve 1 and it is provided with a peripheral flange 6 to be engaged by a plurality of jaws 7 provided on a clamping ring 8. This ring freely encircles the bearing sleeve 1 in rear of an annular threaded ring or nut 9 located and screwed on the bearing sleeve 1,—said threaded ring or nut being made with an angular peripheral portion for the reception of a wrench.

When the ring or nut 9 is screwed inwardly on the sleeve 1, its engagement with the clamping ring will cause said ring to tend to move inwardly and the clamping jaws to press the cap tightly against its seat.

When it is desired to inspect and test the bolt, the cap 5 may be quickly removed, this being accomplished by first screwing the ring or nut outwardly on the bearing sleeve a short distance to release the clamping ring and then removing the latter and the cap. The cap may be as quickly replaced and secured, and in order to facilitate accurate centering of the same on the end of the bearing sleeve, said cap may be made with an inwardly projecting flange or lip 12, as shown in Fig. 2.

I do not claim broadly herein, a clamping device freely embracing the bearing sleeve and engaging the cap, in combination with a ring adjustable on the sleeve and engaged by the clamping device, such structure being covered by my copending application Serial No. 230,895.

Having fully described my invention what I claim as new and desire to secure by Letters-Patent, is:—

1. In a staybolt structure, the combination with a bearing sleeve, and a removable cap constituting a closure for said sleeve, of a clamping member freely encircling the sleeve and adapted to engage said cap, and a nut on said sleeve constituting a temporary securing means for said clamping member.

2. In a staybolt structure, the combination with a bearing sleeve, and a removable cap constituting a closure therefor, of a nut on the bearing sleeve, a ring disposed behind said nut and provided with jaws to engage the peripheral portion of said cap.

In testimony whereof, I have signed this specification in the presence of two subscribing witnesses.

ETHAN I. DODDS.

Witnesses:
  S. G. NOTTINGHAM,
  R. S. FERGUSON.

Copies of this patent may be obtained for five cents each, by addressing the "Commissioner of Patents, Washington, D. C."